(12) United States Patent
Li et al.

(10) Patent No.: US 9,879,540 B2
(45) Date of Patent: Jan. 30, 2018

(54) COMPRESSOR STATOR WITH CONTOURED ENDWALL

(71) Applicant: Pratt & Whitney Canada Corp., Longueuil (CA)

(72) Inventors: Yau-Wai Li, Mississuaga (CA); Karan Anand, Mississauga (CA); Peter Townsend, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 517 days.

(21) Appl. No.: 13/795,936

(22) Filed: Mar. 12, 2013

(65) Prior Publication Data
US 2014/0271158 A1  Sep. 18, 2014

(51) Int. Cl.
*F01D 5/14* (2006.01)
*F01D 9/04* (2006.01)

(52) U.S. Cl.
CPC ............ *F01D 5/143* (2013.01); *F01D 9/04* (2013.01); *F05D 2240/10* (2013.01); *F05D 2240/301* (2013.01); *F05D 2240/304* (2013.01); *F05D 2240/80* (2013.01); *F05D 2250/711* (2013.01); *F05D 2250/712* (2013.01); *Y02T 50/673* (2013.01)

(58) Field of Classification Search
CPC ... F01D 9/02; F01D 9/04; F01D 5/143; F05D 2240/10; F05D 2240/11; F05D 2240/80; F05D 2250/711; F05D 2250/712
See application file for complete search history.

(56) References Cited

U.S. PATENT DOCUMENTS

| 2,724,544 | A | * | 11/1955 | Hardigg | 415/209.4 |
| 2,735,612 | A | | 2/1956 | Hausmann | |
| 2,788,172 | A | | 4/1957 | Stalker | |
| 2,830,753 | A | | 4/1958 | Stalker | |
| 2,918,254 | A | | 12/1959 | Hausammann | |
| 3,004,750 | A | | 10/1961 | Broders | |

(Continued)

FOREIGN PATENT DOCUMENTS

| JP | 06-257597 | * | 9/1994 | F04D 29/32 |
| JP | H06257597 A | | 9/1994 | |

OTHER PUBLICATIONS

European Patent Office, "Extended European Search Report" for European Patent Application No. 14158880.6 dated Jun. 26, 2014.

(Continued)

*Primary Examiner* — Bryan Lettman
*Assistant Examiner* — Timothy Solak
(74) *Attorney, Agent, or Firm* — Norton Rose Fulbright Canada LLP

(57) ABSTRACT

Compressor stators (22) for gas turbine engines (10) are disclosed. An exemplary compressor stator (22) comprises a circumferential array of stator vanes (28) and a shroud (24, 26) for supporting the stator vanes (28). The shroud (24, 26) has a circumferentially extending inner endwall (30, 32) exposed to an annular gas path (20) of the compressor (14). The endwall (30, 32) has a circumferentially uniform axial cross-sectional profile (42). The axial cross-sectional profile (42) comprises at least one deviation (48, 50) from a nominal axial cross-sectional profile (44) defining an overall shape of the annular gas path (20). The at least one deviation comprises a concave deviation (48) and a convex deviation (50).

14 Claims, 9 Drawing Sheets

(56) References Cited

U.S. PATENT DOCUMENTS

| | | | |
|---|---|---|---|
| 4,194,869 A * | 3/1980 | Corcokios | F01D 9/042 415/189 |
| 4,371,311 A | 2/1983 | Walsh | |
| 4,677,828 A | 7/1987 | Matthews et al. | |
| 5,217,348 A | 6/1993 | Rup, Jr. et al. | |
| 5,397,215 A * | 3/1995 | Spear et al. | 415/191 |
| 5,447,413 A | 9/1995 | Maier et al. | |
| 5,466,123 A * | 11/1995 | Rose | 415/182.1 |
| 5,653,580 A * | 8/1997 | Faulder et al. | 415/209.3 |
| 6,017,186 A | 1/2000 | Hoeger et al. | |
| 6,146,089 A | 11/2000 | Allen et al. | |
| 6,283,713 B1 | 9/2001 | Harvey et al. | |
| 6,312,221 B1 | 11/2001 | Yetka et al. | |
| 6,338,609 B1 | 1/2002 | Decker et al. | |
| 6,508,630 B2 | 1/2003 | Liu et al. | |
| 6,561,761 B1 | 5/2003 | Decker et al. | |
| 6,669,445 B2 * | 12/2003 | Staubach | F01D 5/142 415/914 |
| 6,705,834 B1 | 3/2004 | Jacobsson | |
| 6,837,679 B2 | 1/2005 | Kawarada et al. | |
| 7,220,100 B2 | 5/2007 | Lee et al. | |
| 7,354,242 B2 | 4/2008 | Harvey | |
| 7,465,155 B2 | 12/2008 | Nguyen | |
| 7,484,935 B2 | 2/2009 | Heitland et al. | |
| 7,887,297 B2 | 2/2011 | Allen-Bradley et al. | |
| 8,061,980 B2 | 11/2011 | Praisner et al. | |
| 8,100,643 B2 | 1/2012 | Leblanc et al. | |
| 8,192,153 B2 | 6/2012 | Harvey et al. | |
| 8,313,291 B2 | 11/2012 | Mariotti et al. | |
| 2002/0141863 A1 * | 10/2002 | Liu et al. | 415/192 |
| 2006/0024158 A1 * | 2/2006 | Hoeger et al. | 415/182.1 |
| 2006/0069533 A1 | 3/2006 | Florea et al. | |
| 2008/0080970 A1 | 4/2008 | Cooke et al. | |
| 2009/0035130 A1 | 2/2009 | Sonoda et al. | |
| 2010/0172749 A1 * | 7/2010 | Mitsuhashi | F01D 5/143 415/193 |

OTHER PUBLICATIONS

European Patent Office, Response dated Mar. 17, 2015 to "Extended European Search Report" for European Patent Application No. 14158880.6.

Dehns, Communication to European Patent Office dated Jun. 19, 2017 re: European Patent Application No. 14158880.6.

European Patent Office; Communication re: European Patent Application No. 14158880.6 dated Dec. 9, 2016.

* cited by examiner

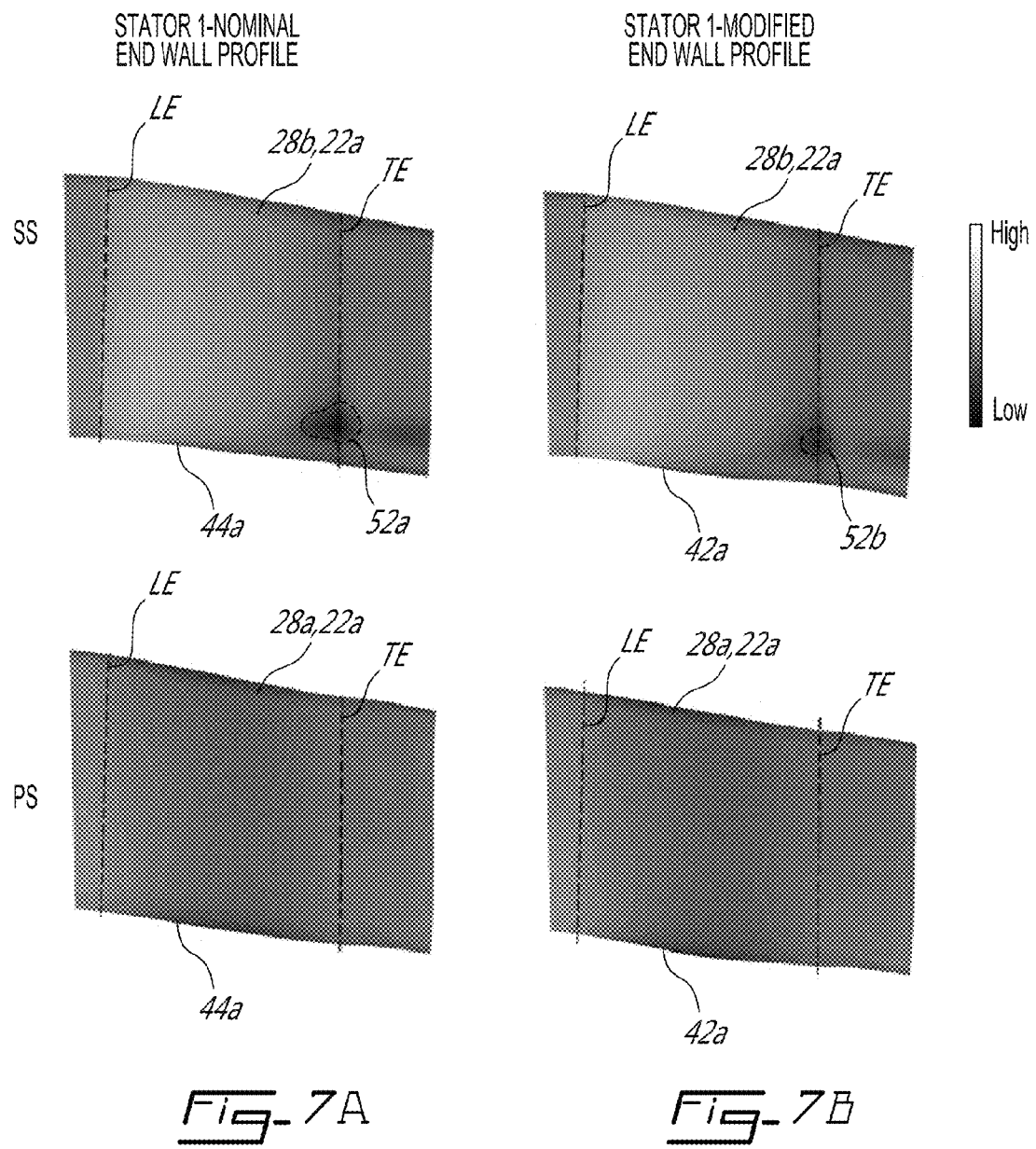

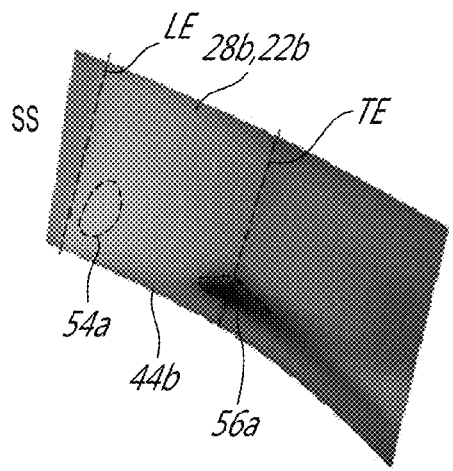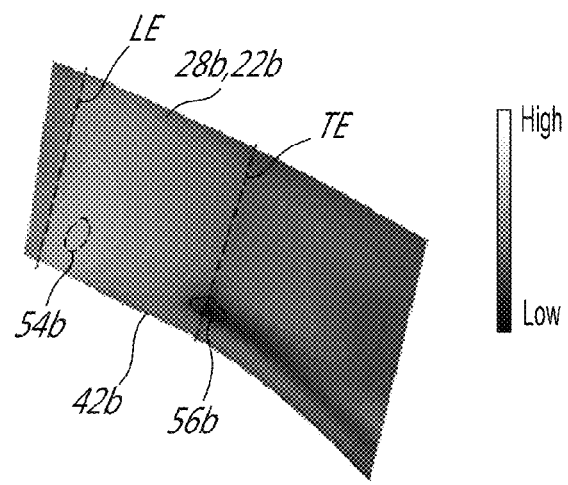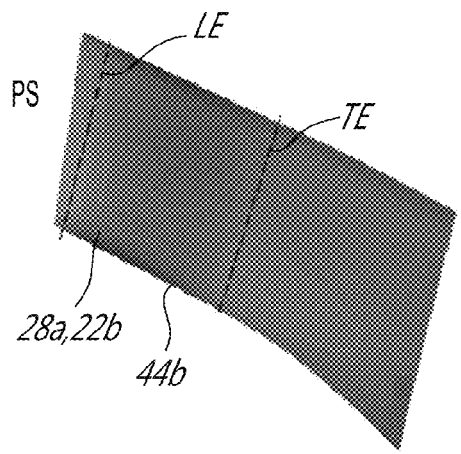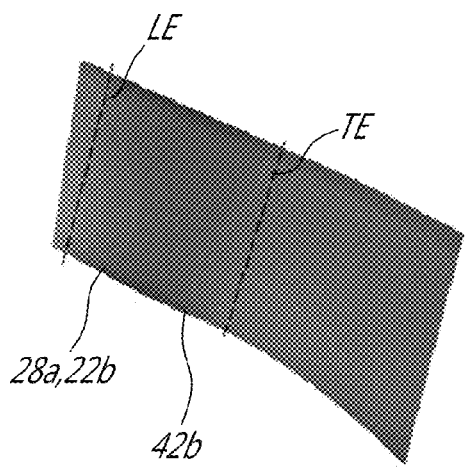
Fig-8A        Fig-8B

STATOR 2-NOMINAL
END WALL PROFILE
STATOR 2-MODIFIED
END WALL PROFILE
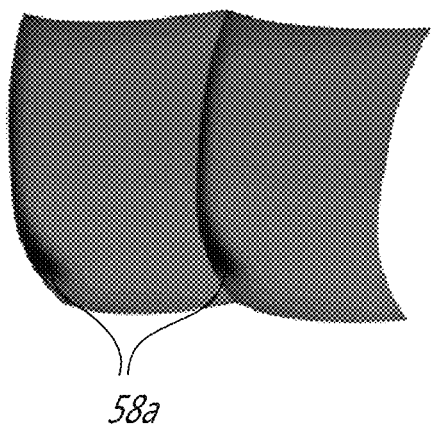
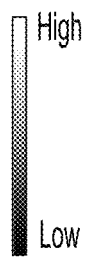
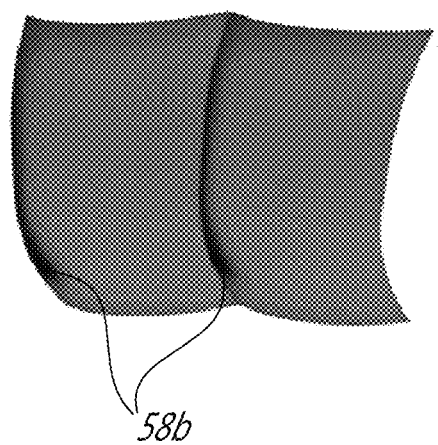
High
Low
58a
58b
Fig-9A
Fig-9B

COMPRESSOR STATOR WITH CONTOURED ENDWALL

TECHNICAL FIELD

The disclosure relates generally to gas turbine engines, and more particularly to flow through compressor stages of gas turbine engines.

BACKGROUND OF THE ART

Airfoils such as stationary vanes in compressor or turbine sections of gas turbine engines use surface curvature to change the static pressure of the fluid (e.g., gas) flowing therethrough to redirect the flow of fluid. Such airfoils can be arranged in one or more rows circumferentially extending about a central longitudinal axis of such engines and can extend generally radially relative to the central axis. An annular gas path through the one or more rows of airfoils can be defined by circumferential endwalls radially inward and/or radially outward from the one or more rows of airfoils.

During operation, secondary flows can develop on or near such endwalls and produce energy losses. Attempts have been made to reduce the development of such secondary flows through the modification of the geometry of the endwalls. However, existing methods can result in endwall geometries that are relatively complex and expensive to produce.

Improvement is therefore desirable.

SUMMARY

The disclosure describes devices, assemblies and methods that may influence fluid flow through compressors of gas turbine engines.

In one aspect, the disclosure describes a compressor stator. The compressor stator comprises:
a circumferential array of stator vanes; and
a shroud for supporting the stator vanes, the shroud having a circumferentially extending inner endwall exposed to an annular gas path of the compressor, the endwall having a circumferentially uniform axial cross-sectional profile, the axial cross-sectional profile comprising at least one deviation from a nominal axial cross-sectional profile defining an overall shape of the annular gas path, the at least one deviation comprising a concave deviation having a maximum deviation from the nominal profile at a position substantially corresponding to an axial position of a maximum thickness of at least one of the vanes.

In another aspect, the disclosure describes a compressor stator comprising:
a circumferential array of stator vanes; and
a shroud for supporting the stator vanes, the shroud having a circumferentially extending inner endwall exposed to an annular gas path of the compressor, the endwall having a circumferentially uniform axial cross-sectional profile, the axial cross-sectional profile comprising a concave deviation and a convex deviation from a nominal axial cross-sectional profile defining an overall shape of the annular gas path.

In a further aspect, the disclosure describes a gas turbine engine comprising a compressor stator as defined herein.

Further details of these and other aspects of the subject matter of this application will be apparent from the detailed description and drawings included below.

DESCRIPTION OF THE DRAWINGS

Reference is now made to the accompanying drawings, in which:

FIGS. 7A and 7B show axial maps of relative Mach numbers near a suction side (SS) of a vane in the first stator of FIG. 4 and also near a pressure side (PS) of the vane illustrating a comparison between an endwall defined by a nominal profile (FIG. 7A) and an endwall defined by a modified profile (FIG. 7B);

FIGS. 8A and 8B show axial maps of relative Mach numbers near a suction side (SS) of a vane in the second stator of FIG. 4 and also near a pressure side (PS) of the vane illustrating a comparison between an endwall defined by a nominal profile (FIG. 8A) and an endwall defined by a modified profile (FIG. 8B); and FIGS. 9A and 9B show transverse maps of relative Mach numbers near a trailing edge of vanes in the second stator of FIG. 4 illustrating a comparison between an endwall defined by the nominal profile (FIG. 9A) and an endwall defined by the modified profile (FIG. 9B).

DETAILED DESCRIPTION

Aspects of various embodiments are described through reference to the drawings.

Figure 1:
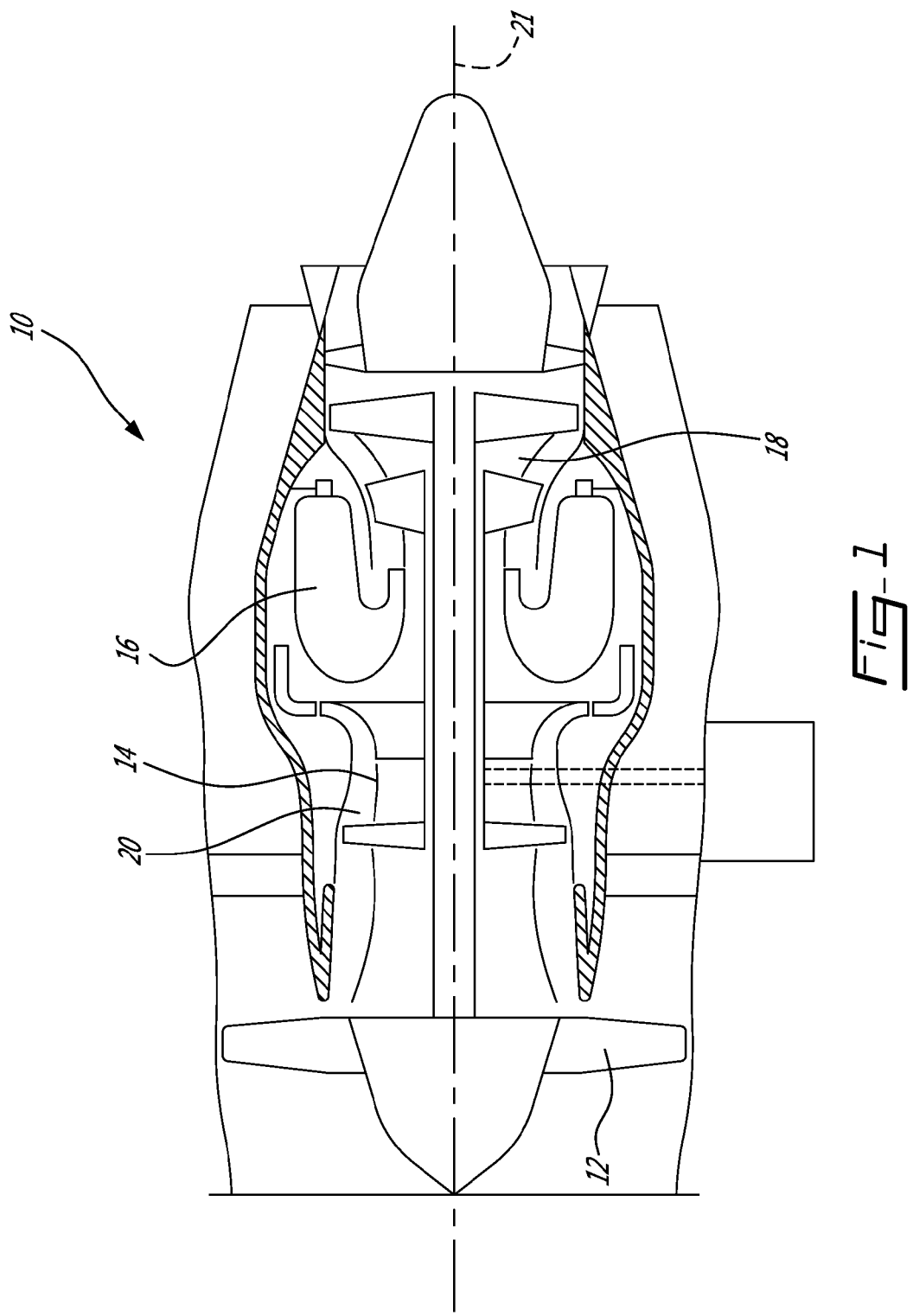
FIG. 1 shows a schematic axial cross-section view of a turbo-fan gas turbine engine.

FIG. 1 illustrates gas turbine engine 10 of a type preferably provided for use in subsonic flight. While engine 10 is illustrated as a turbo-fan type of gas turbine engine, one skilled in the relevant arts will understand that the teachings of the present disclosure could also be applied to other types of turbine engines such as turbo-shaft or turbo-prop gas turbine engines for aircraft and/or ground-based applications.

Engine 10 may generally comprise, in serial flow communication, fan 12 through which ambient air is propelled, multistage compressor 14 for pressurizing the air, combustor 16 in which the compressed air is mixed with fuel and ignited for generating an annular stream of hot combustion gases, and a turbine section 18 for extracting energy from the combustion gases. Compressor 14 may comprise annular gas path 20 along which the air is pressurized prior to delivery to combustor 16. Engine 10 may have central longitudinal axis 21.

Figure 2:
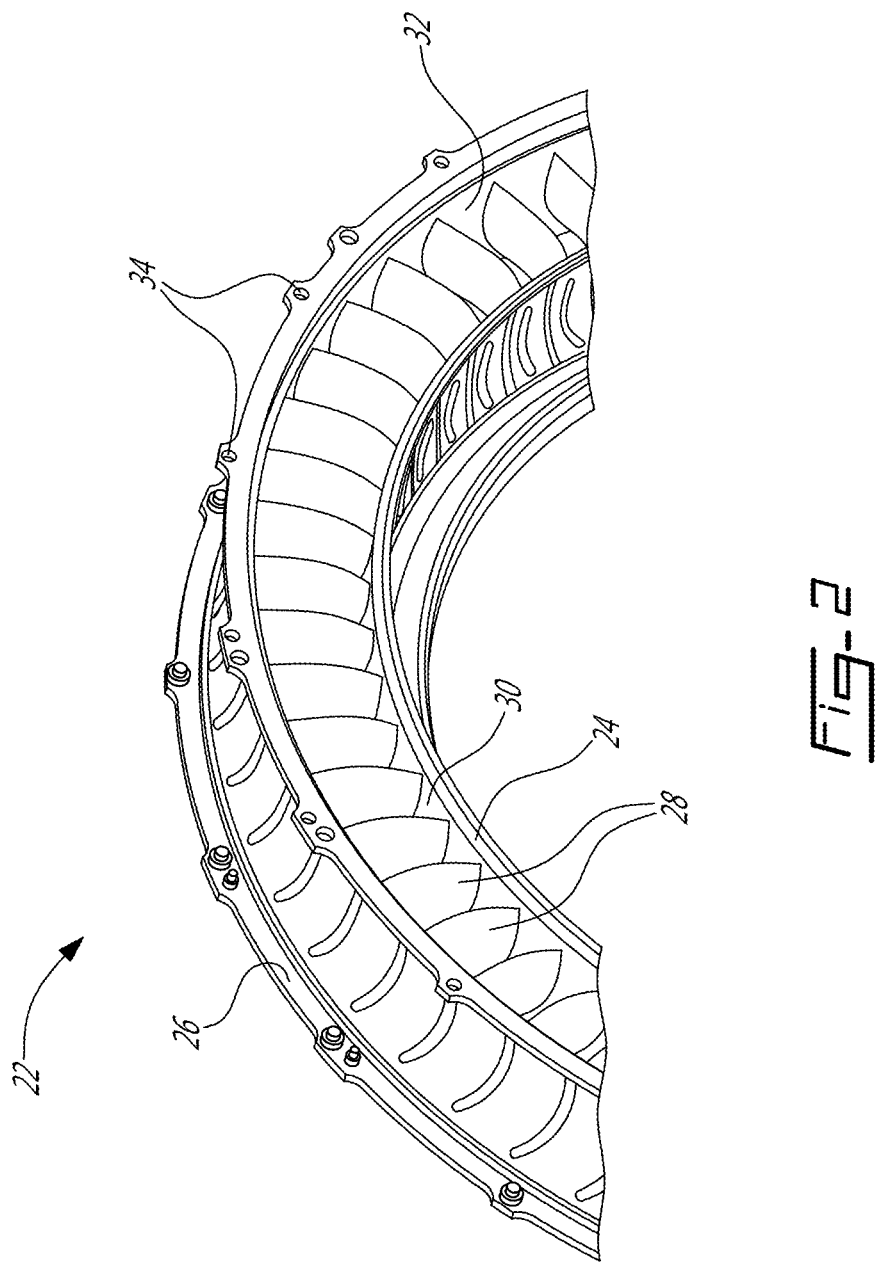
FIG. 2 shows a partial axonometric view of a stator assembly of a compressor of the engine of FIG. 1.

FIG. 2 shows a partial axonometric view of stator 22 (e.g., stator assembly), which may be part of one or more low pressure stages of compressor 14 of engine 10. Stator 22 may have an annular overall shape and may have a central axis corresponding substantially to axis 21 of engine 10 when installed in engine 10. Stator 22 may be an assembly comprising radially inner shroud(s) 24, radially outer shroud(s) 26 and one or more vanes 28 (i.e., airfoils)

extending between and supported by radially inner shroud(s) 24 and radially outer shroud(s) 26. Radially inner shroud 24 and radially outer shroud 26 may define a portion of annular gas path 20 therebetween. Radially inner shroud 24 may comprise circumferentially extending inner endwall(s) 30 and radially outer shroud 26 may comprise circumferentially extending outer endwall(s) 32. Inner endwall(s) 30 and outer endwall(s) 32 may each be made from a single component or may comprise multiple components assembled together.

Stator 22 may comprise means for securing stator 22 in engine 10. For example, radially outer shroud 26 may comprise one or more mounting holes 34 that may receive one or more fasteners for securing radially outer shroud 26 to a casing or other structural component(s) of engine 10.

Figure 3:
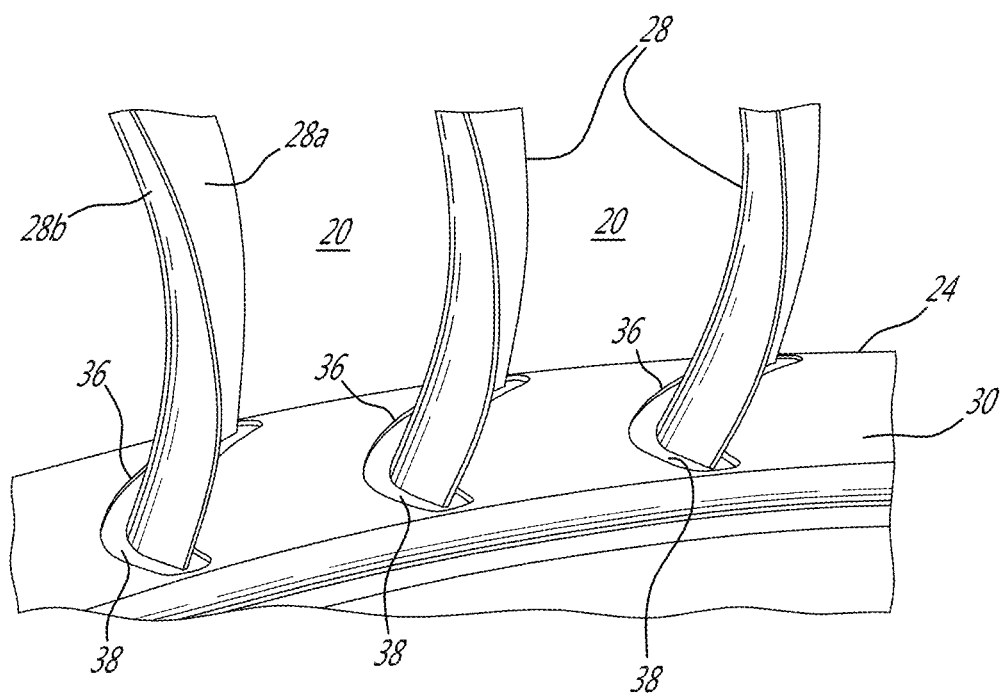
FIG. 3 shows a partial axonometric view of an inner shroud and vanes of the stator assembly of FIG. 2.

FIG. 3 shows a partial axonometric view of radially inner shroud 24 and vanes 28 of stator 22 shown in FIG. 2. As shown, each vane 28 may comprise concave pressure side 28a and convex suction side 28b. Each vane 28 may also have a varying thickness between its leading edge and its trailing edge. Inner endwall 30 may comprise one or more vane support elements circumferentially spaced along inner endwall 30 that may be used for securing vanes 28 to radially inner shroud 24. For example, such vane support elements may include one or more slots 36. Slots 36 may comprise cut-outs in inner endwall 30. Each slot 36 may be configured to receive a radial end of one of vanes 28. Each vane 28 may be supported by radially inner shroud 24 via one or more grommets 38. For example, grommet(s) 38 may comprise a relatively resilient (flexible) material such as an elastomer (e.g., rubber) and may dampen vibrations. Grommet(s) 38 may also provide a seal between vanes 28 and inner endwall 30. While FIG. 3 illustrates an exemplary embodiment of the interface between vanes 28 and inner endwall 30, it is understood that a similar interface including slots 36 and grommets 38 may also be suitable for use between vanes 28 and outer endwall 32. It is also understood that other types of vane support elements could be used to secure vanes 28 to radially inner shroud 24 and radially outer shroud 26. For example, one or more of vanes 28 could be brazed, welded or otherwise secured to radially inner shroud 24 and/or radially outer shroud 25. Alternatively, one or more of vanes 28 could be integrally formed with one or more of radially inner shroud 24 and radially outer shroud 26 and further processed (e.g., machined) using known or other processes.

Figure 4:
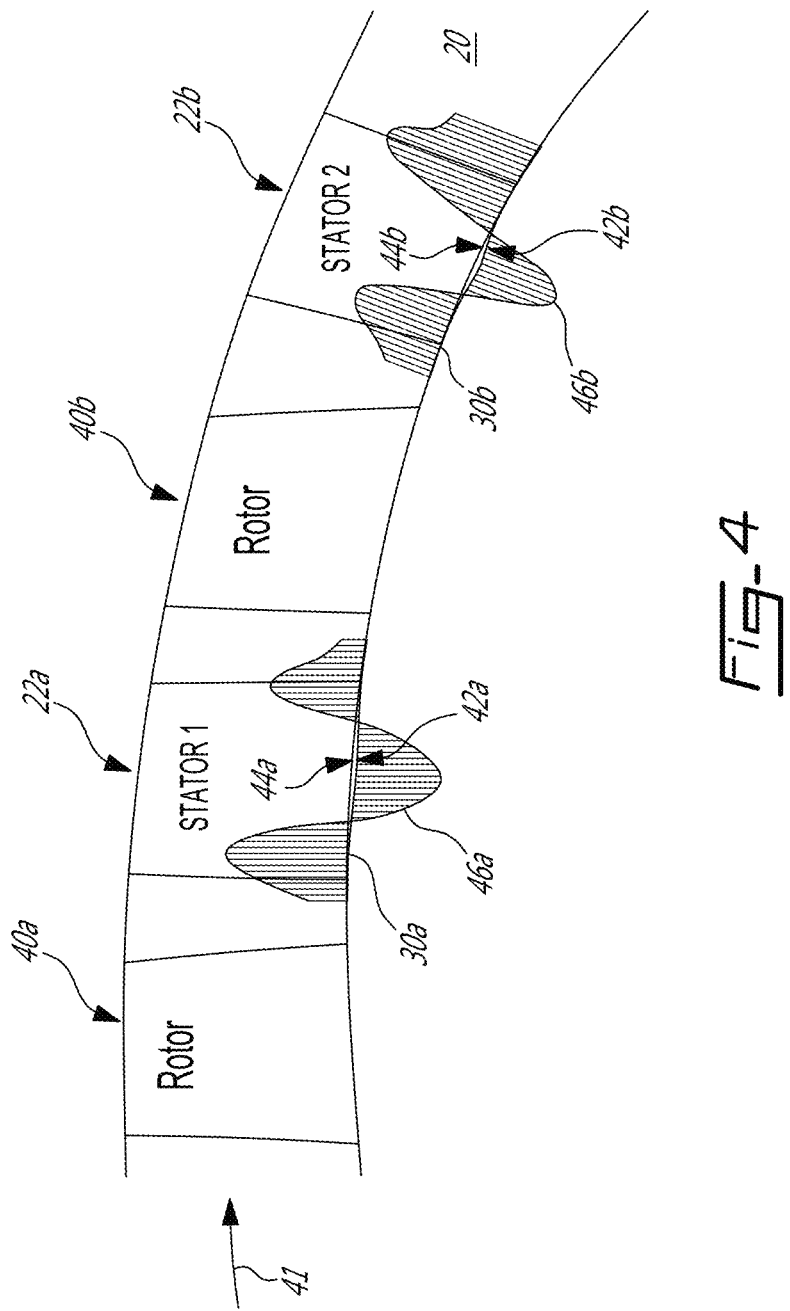
FIG. 4 shows a partial axial cross-sectional view of a low pressure stage of the compressor of the engine of FIG. 1 showing a first stator and a second stator disposed downstream from the first stator.

FIG. 4 shows a partial schematic axial cross section of a low pressure stage of compressor 14. Compressor 14 of engine 10 may comprises multiple stages and accordingly may comprise a plurality of rotors 40a, 40b including rotor blades and a plurality of stators 22a, 22b. First stator 22a and second stator 22b may have a construction substantially similar to that of stator 22 illustrated in FIG. 2 but may have different dimensions and geometric characteristics depending on where they are disposed in compressor 14. For example, first stator 22a may be disposed upstream from second stator 22b. As shown, rotors 40a, 40b and stators 22a, 22b may be arranged in an alternating manner along gas path 20. It is understood that compressor 14 could comprise additional or fewer rotors 40a, 40b and stators 22a, 22b in order to achieve a desired pressurization and performance for a particular application.

FIG. 4 also shows an exemplary schematic axial cross sectional profiles of inner endwall 30a of first stator 22a and also of inner endwall 30b of second stator 22b. Each of inner endwalls 30a, 30b may be circumferentially extending about central axis 21 (see FIG. 1) and may be exposed to annular gas path 20 of compressor 14. The overall fluid (e.g., air) flow (i.e., primary flow) through annular gas path 20 may be in the general direction indicated by arrow 41. Each inner endwall 30a, 30b may be defined by circumferentially uniform axial cross-sectional profiles 42a, 42b respectively. Axial cross-sectional profiles (hereinafter "modified profiles") 42a, 42b may comprise at least one deviation from nominal (i.e., baseline) axial cross-sectional profile (hereinafter "nominal profiles") 44a, 44b. The at least one deviation of each of modified profiles 42a, 42b from corresponding nominal profiles 44a, 44b may be configured to influence the flow of fluid (e.g., air) through annular gas path 20. For example, as explained further below, the at least one deviation in annular profiles 42a, 42b may be configured to improve the flow characteristics (e.g., reduce the formation of secondary flows) and reduces losses. Nominal profiles 44a, 44b may define a baseline overall shape of at least a portion of annular gas path 20 defined between radially inner shroud(s) 24 and radially outer shroud(s) 26. Nominal profiles 44a, 44b may be portions (e.g., between a leading edge and a trailing edge of a vane) of a relatively smooth and continuous baseline curve defining the overall shape of annular gas path 20.

Figure 5:
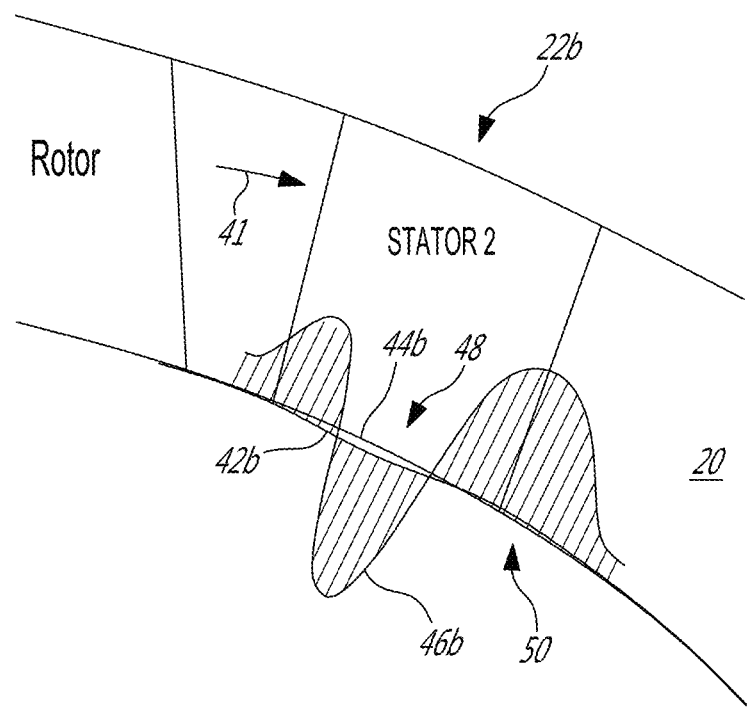
FIG. 5 shows a partial axial cross-sectional view of the low pressure stage of the compressor of the engine of FIG. 1 showing second stator of FIG. 4.

FIG. 5 shows a more detailed axial cross-sectional view of second stator 22b. Whiskers 46a, 46b shown in FIGS. 4 and 5 are based on a porcupine analysis and are representative of the smoothness and radius of curvature of modified profiles 42a, 42b respectively.

Figure 6A:
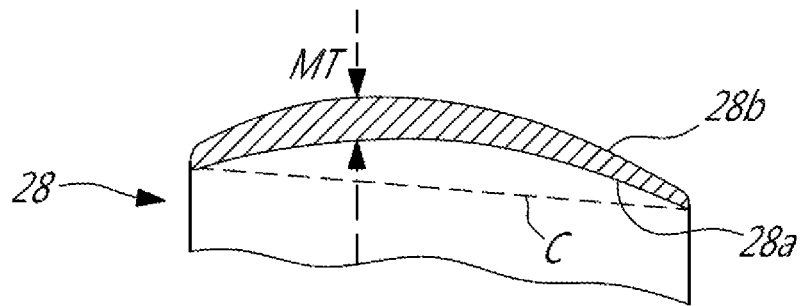
FIGS. 6A and 6B respectively show a schematic cross-sectional view and a side elevation view of a vane.
Figure 6B:
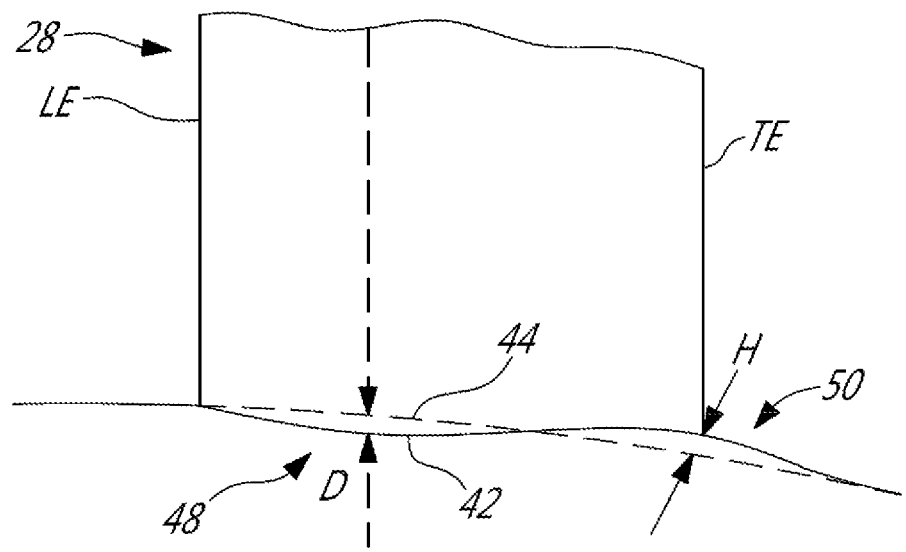

FIG. 6B shows a schematic side elevation view of vane 28 to illustrate conceptual aspects of modified profile(s) 42 (e.g., modified profiles 42a and 42b). The deviations of modified profile 42 from nominal profile 44 (e.g., concave deviation 48 and convex deviation 50) have been enhanced in FIG. 6B for the purpose of illustration only. FIG. 6A shows a cross-sectional view of vane 28.

The at least one deviation of modified profile 42 may comprise one or more concave deviations 48 relative to nominal profile 44. Concave deviation 48 may extend away from annular gas path 20 and consequently may cause an expansion of the cross-sectional area (e.g., increase in height) of annular gas path 20 relative to nominal profile 44. Concave deviation 48 may comprise a concavity (e.g., dip) relative to nominal profile 44. The geometry of concave deviation 48 may be based on the geometry and/or position of at least one of vanes 28. For example, concave deviation 48 may have a maximum deviation (depth) D at a position corresponding substantially to an axial position of a maximum thickness MT of at least one of the vanes 28. Accordingly, concave deviation 48 may cause a local increase in height of annular gas path 20 and may compensate, at least to some extent, for the reduction of local flow area through annular gas path 20 caused by the presence of vanes 28 in annular gas path 20. Concave deviation 48 may merge relatively smoothly with a remainder of modified profile 42b. For example, concave deviation 48 may have a maximum deviation from nominal profile 42b that is greater than 0.5% of a nominal chord C of vane 28. The nominal chord C of vane 28 may be the length of a straight line extending between the trailing edge TE and the leading edge LE of vane 28 (e.g., axial extremities of vane 28). It is understood that concave deviation 48 as described herein could also be applied to first stator 22a, second stator 22b and/or any other stator(s) 22 part of compressor 14. In some embodiments, concave deviation 48 may influence the flow through stator 22 by increasing the flow area at or near a position of maximum thickness MT of vane 28 and favorably alter the gaspath curvature. This may result in increased diffusion of stator 22 in the sensitive endwall region and may result in improved performance.

Alternatively or in addition, the at least one deviation of modified profile 42 may comprise one or more convex deviations 50 relative to nominal profile 44. Convex deviation(s) 50 may extend into annular gas path 20 and may consequently cause a reduction of the cross-sectional area (e.g., decrease in height) of annular gas path 20 relative to nominal profile 44. Convex deviation 50 may be disposed downstream from concave deviation 48. Convex deviation 50 may comprise a convexity (e.g., rise) relative to nominal profile 44. The geometry of convex deviation 50 may be based on the geometry and/or position of at least one of vanes 28. For example, convex deviation 50 may have a maximum deviation (height) H at a position corresponding substantially to an axial position of trailing edge TE of at least one of the vanes 28. Accordingly, convex deviation 50 may cause a reduction in height of annular gas path 20 and may affect flow of fluid (e.g., air) exiting second stator 22. In some embodiments, convex deviation 50 may further influence the flow through stator 22 by reducing the flow area at or near an exit of stator 22 and favorably alter the gaspath curvature. This may result in less diffusion at trailing edge TE of vane 28 in the sensitive endwall region which can result in improved stall margin.

Convex deviation 50 may merge relatively smoothly with a remainder of modified profile 42. For example, convex deviation 50 may have a maximum deviation from nominal profile 42 that is greater than 0.5% of a nominal chord C of vane 28. It is understood that convex deviation 50 as described herein could also be applied to first stator 22a, second stator 22b and/or to any other stator(s) 22 part of compressor 14. It is also understood that modified profile(s) 42a, 42b as described herein or other types of modified profiles that deviate from a nominal (i.e., baseline) profile could be applied to inner endwall(s) 30 and/or outer endwall(s) 32 to influence flow characteristics through stator(s) 22.

In some embodiments, the use of one or more deviations (e.g., concave deviation 48 and/or convex deviation 50) may contribute in providing a more uniform velocity distribution between leading edge LE and trailing edge TE of vane(s) 28. For example, such deviation(s) may reduce the blade to blade pressure differential (i.e., aero loading). As explained below, this may lead to less secondary flow accumulation (e.g., reduction in low momentum flow accumulation) on suction side(s) 28b of vane(s) 28, thus reducing the potential for flow separation and improving the performance and operability of compressor 14.

As mentioned above, circumferentially extending endwalls 30, 32 (e.g., inner endwall and/or outer endwall) may be defined by circumferentially uniform axial cross-sectional (modified) profile(s) 42 that deviate(s) from nominal axial cross-sectional profile(s) 44. In other words, circumferentially extending endwalls 30, 32 may be defined by modified profile(s) 42 that has/have been revolved about axis 21. Accordingly, endwalls 30, 32 may comprised one or more revolved surface(s) based on modified profile(s) 42 revolved about axis 21. Accordingly, endwalls 30, 32 may have a substantially circumferentially uniform cross-section but it is understood that an axial cross-section of endwalls 30, 32 taken through one of slots 36 may comprise a break (e.g., interruption) due to the presence of such slot 36 (i.e., the absence of a wall).

One or more of endwalls 30, 32 may comprise one or more revolved surface(s) for exposure to annular gas path 20 and slots 36 may be formed along endwall(s) 30, 32. Accordingly, endwall(s) 30, 32 may be designed based on modified profile(s) 42 revolved entirely (i.e., 360 degrees) about axis 21 and produced using conventional or other manufacturing processes. For example, endwall(s) 30, 32 may be produced using conventional or other types of machining to have a circumferentially uniform axial cross-sectional profile in accordance with modified profile(s) 42. Vane support elements (e.g., slots 36) may also be formed along endwall(s) 30, 32 using conventional or other manufacturing process(es). For example, vane support elements (e.g., slots 36) may be formed along endwall(s) 30, 32 before or after machining of endwall(s) 30, 32.

The geometry of endwall(s) 30, 32 based on a circumferentially uniform axial cross-sectional profile (i.e. modified profile 42) may be considered 2-dimensional contouring of endwall(s) 30, 32. Such 2-D contouring may be relatively simpler to manufacture than other more complex (e.g., 3-dimentional) contouring.

During use, modified profile(s) 42, upon which at least one of the circumferentially extending endwalls 30, 32 of stator(s) 22a, 22b may be based, may influence fluid flow through stator(s) 22. For example modified profile(s) 42 may cause a reduction in losses and improve performance of compressor 14 compared to nominal profile(s) 44. For example, modified profile(s) 42 may affect endwall boundary layer growth and consequently boundary layer loss and secondary loss. Consequently, this may contribute towards increasing the surge margin of compressor 14 (e.g., low pressure compressor).

FIGS. 7A and 7B show axial maps, obtained through simulation using computational fluid dynamics (CFD), of relative Mach numbers near a suction side 28b (SS—upper maps) of one of vanes 28 and near a pressure side 28a (PS—lower maps) of vane 28 of first stator 22a. The leading edge LE and trailing edge TE of vane 28 are identified and shown in stippled lines in the maps of FIGS. 7A and 7B. FIG. 7A (upper and lower) shows axial maps of relative Mach numbers for endwall 30a defined by nominal profile 44a and FIG. 7B (upper and lower) shows axial maps of relative Mach numbers for endwall 30a defined by modified profile 42a. FIGS. 7A and 7B (upper and lower maps) show axial maps of relative Mach numbers in annular gas path 20 over similar axial spans.

The upper maps (SS—suction side of vane 28) of FIGS. 7A and 7B show regions 52a and 52b of relatively low Mach number. These regions 52a and 52b may be representative of secondary flows developed as a result of static pressure differentials in annular gas path 20. For example, regions 52a and 52b may each be representative of one or more regions of low momentum flow accumulation being formed at, near and/or downstream of the trailing edge of vane 28. As shown in the upper maps of FIGS. 7A and 7B, low Mach number region 52b may be smaller than low Mach number region 52a. This may be indicative of a smaller region of low momentum flow accumulation in the upper map of FIG. 7B than in the upper map of FIG. 7A. Accordingly, this may be indicative of a reduction in secondary losses when endwall 30a is defined by modified profile 42a in comparison with endwall 30a being defined by nominal profile 44a.

For example, a region of low momentum flow accumulation at or near endwall(s) 30, 32 of compressor 14 can create losses. The intensity of low momentum flow accumulation can tend to increase as the region extends downstream through compressor 14. Boundary layer losses and secondary losses (i.e., losses caused by migration of boundary layer from a region of high static pressure to a region of low static pressure) can cause the intensity of low momentum flow accumulation and associated losses to increase. The existence of such region of low momentum flow accumulation can cause premature flow separation and reduce the operable range of compressor 14.

FIGS. 8A and 8B show axial maps, obtained through simulation using computational fluid dynamics (CFD), of relative Mach numbers near a suction side 28b (SS—upper maps) of one of vanes 28 and near a pressure side 28a (PS—lower maps) of vane 28 of second stator 22b (e.g., downstream from first stator 22a). The leading edge (LE) and trailing edge (TE) of vane 28 are shown in stippled lines in the maps of FIGS. 8A and 8B. FIG. 8A (upper and lower) shows axial maps of relative Mach numbers for endwall 30b being defined by nominal profile 44b and FIG. 8B (upper and lower) shows axial maps of relative Mach numbers for endwall 30b being defined by modified profile 42a. FIGS. 8A and 8B (upper and lower maps) show axial maps of relative Mach numbers in annular gas path 20 over similar axial spans.

The upper maps (SS—suction side of vane 28) of FIGS. 8A and 8B show regions 54a and 54b of relatively high Mach number. These regions 54a and 54b may result from static pressure differentials in annular gas path 20. As shown in the upper maps of FIGS. 8A and 8B, the size of high Mach number region 54b may be smaller than high Mach number region 54a. Accordingly, this may be indicative of an improvement in the uniformity of flow velocity in annular gas path 20 when endwall 30b is defined by modified profile 42b in comparison with endwall 30b being defined by nominal profile 44b.

The upper maps (SS—suction side of vane 28) of FIGS. 8A and 8B also show regions 56a and 56b of relatively low Mach number. Again, these regions 56a and 56b may be representative of secondary flows developed as a result of static pressure differentials in annular gas path 20. For example, regions 56a and 56b may each be representative of one or more regions of low momentum flow accumulation forming at, near and/or downstream of the trailing edge of vane 28. As shown in the upper maps of FIGS. 8A and 8B, low Mach number region 56b may be smaller than low Mach number region 56a. This may be indicative of a smaller region of low momentum flow accumulation in the upper map of FIG. 8B than in the upper map of FIG. 8A. Accordingly, this may be indicative of a reduction in secondary losses when endwall 30b is defined by modified profile 42b in comparison with endwall 30b being defined by nominal profile 44b.

FIGS. 9A and 9B show transverse maps, obtained through simulation using computational fluid dynamics (CFD), of relative Mach numbers near the trailing edge of vane 28 and between vanes 28 of second stator 22b (e.g., downstream from first stator 22a). FIG. 9A shows a transverse map of relative Mach number for endwall 30b being defined by nominal profile 44b and FIG. 9B shows transverse maps of relative Mach number for endwall 30b being defined by modified profile 42b.

FIGS. 9A and 9B show regions 58a and 58b of relatively low Mach number. Again, these regions 58a and 58b may be representative of secondary flows developing as a result of static pressure differentials in annular gas path 20. For example, regions 58a and 58b may each be representative of one or more region(s) of low momentum flow accumulation forming at, near and/or downstream of the trailing edge of vane(s) 28. As shown in the upper maps of FIGS. 9A and 8B, low Mach number region 58b may be smaller than low Mach number region 58a. This may be indicative of a smaller region of low momentum flow accumulation in FIG. 9B than in FIG. 9A. Accordingly, this may be indicative of a reduction in secondary losses when endwall 30b is defined by modified profile 42b in comparison with endwall 30b being defined by nominal profile 44b.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. Also, one skilled in the relevant arts will appreciate that while the systems, devices and assemblies disclosed and shown herein may comprise a specific number of elements/components, the systems, devices and assemblies could be modified to include additional or fewer of such elements/components. For example, while any of the elements/components disclosed may be referenced as being singular, it is understood that the embodiments disclosed herein could be modified to include a plurality of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. A compressor stator comprising:
   a circumferential array of stator vanes; and
   a radially inner shroud for supporting the stator vanes, the shroud having a circumferentially extending inner endwall exposed to an annular gas path of the compressor, the endwall having a circumferentially uniform, modified axial cross-sectional profile between the stator vanes, the modified axial cross-sectional profile comprising a concave deviation and a convex deviation from a nominal axial cross-sectional profile defining a baseline;
   wherein the convex deviation has a maximum deviation from the nominal profile at a position corresponding to an axial position of a trailing edge of at least one of the vanes, the convex deviation being convex toward the annular gas path and extending from a first axial position on the inner endwall upstream of the trailing edge to a second axial position on the inner endwall downstream of the trailing edge.

2. The compressor stator as defined in claim 1, wherein the concave deviation has a maximum deviation from the nominal profile at a position corresponding to an axial position of a maximum thickness of at least one of the vanes.

3. The compressor stator as defined in claim 2, wherein the concave deviation has a maximum deviation from the nominal profile that is greater than 0.5% of a nominal chord of one of the vanes.

4. The compressor stator as defined in claim 1, wherein the convex deviation has a maximum deviation from the nominal profile that is greater than 0.5% of a nominal chord of one of the vanes.

5. The compressor stator as defined in claim 1, wherein the concave deviation has a maximum deviation from the nominal profile that is greater than 0.5% of a nominal chord of one of the vanes.

6. The compressor stator as defined in claim 1, wherein the shroud comprises a plurality of slots formed in the endwall for receiving radial ends of the vanes.

7. A gas turbine engine comprising the compressor stator as defined in claim 1.

8. The compressor stator as defined in claim 1, wherein the concave deviation extends from one side of the nominal profile and the convex deviation extends from another side of the nominal profile.

9. A compressor stator comprising:
a circumferential array of stator vanes; and
a radially inner shroud for supporting the stator vanes, the shroud having a circumferentially extending inner endwall exposed to an annular gas path of the compressor, the endwall having a circumferentially uniform, modified axial cross-sectional profile between the stator vanes, the modified axial cross-sectional profile comprising at least one deviation from a nominal axial cross-sectional profile defining a baseline, the at least one deviation comprising:
a concave deviation having a maximum deviation from the nominal profile at a position corresponding to an axial position of a maximum thickness of at least one of the vanes; and
a convex deviation having a maximum deviation from the nominal profile at a position corresponding to an axial position of a trailing edge of the at least one of the vanes, the convex deviation being convex toward the annular gas path and extending from a first axial position on the inner endwall upstream of the trailing edge to a second axial position on the inner endwall downstream of the trailing edge.

10. The compressor stator as defined in claim 9, wherein the concave deviation has a maximum deviation from the nominal profile that is greater than 0.5% of a nominal chord of one of the vanes.

11. The compressor stator as defined in claim 9, wherein the shroud comprises a plurality of slots formed in the endwall for receiving radial ends of the vanes.

12. The compressor stator as defined in claim 9, wherein the convex deviation is disposed axially downstream of the concave deviation.

13. The compressor stator as defined in claim 9, wherein the convex deviation has a maximum deviation from the nominal profile that is greater than 0.5% of a nominal chord of one of the vanes.

14. The compressor stator as defined in claim 9, wherein the concave deviation extends from one side of the nominal profile and the convex deviation extends from another side of the nominal profile.

\* \* \* \* \*